Oct. 9, 1934.  G. W. POPPE  1,976,513

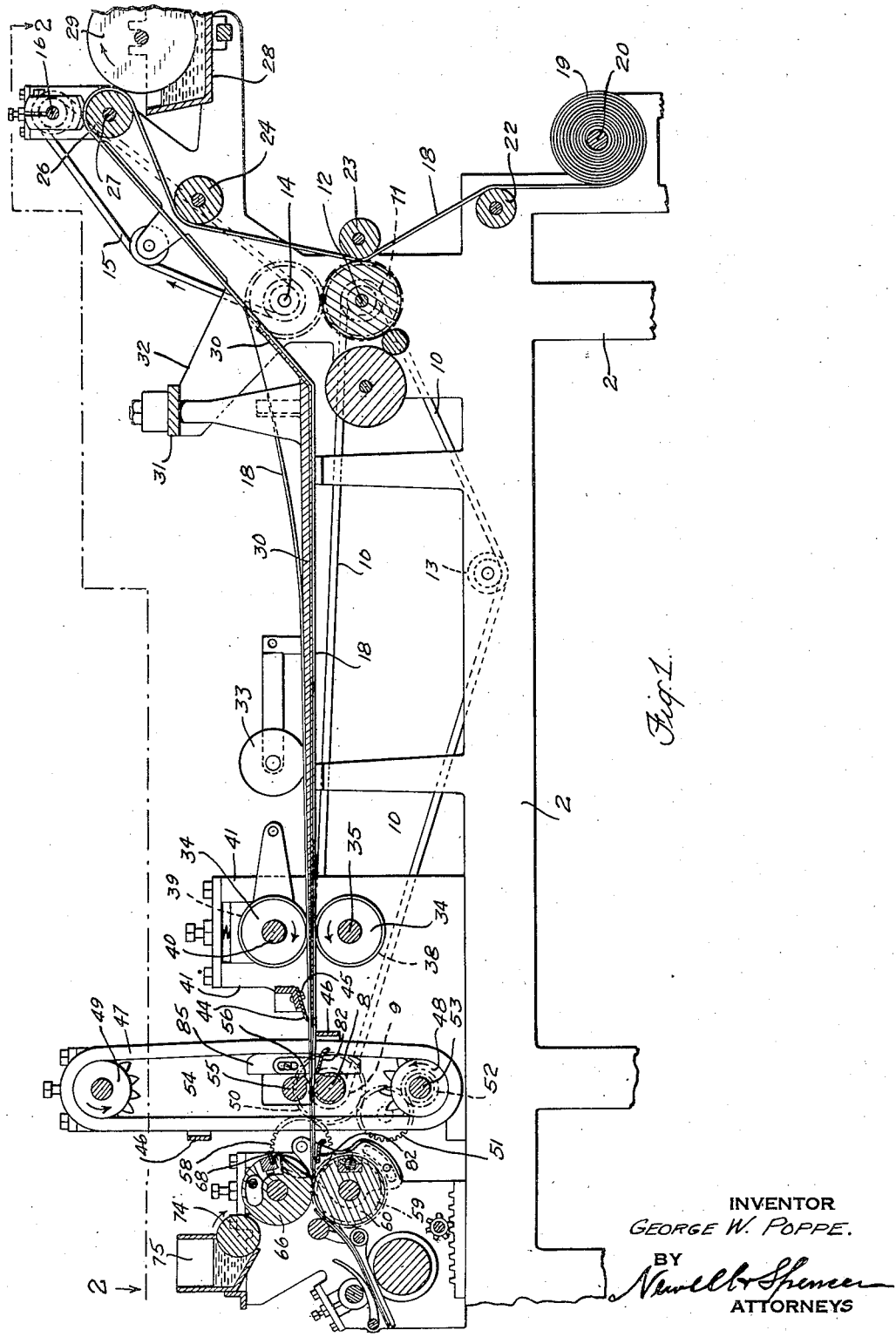

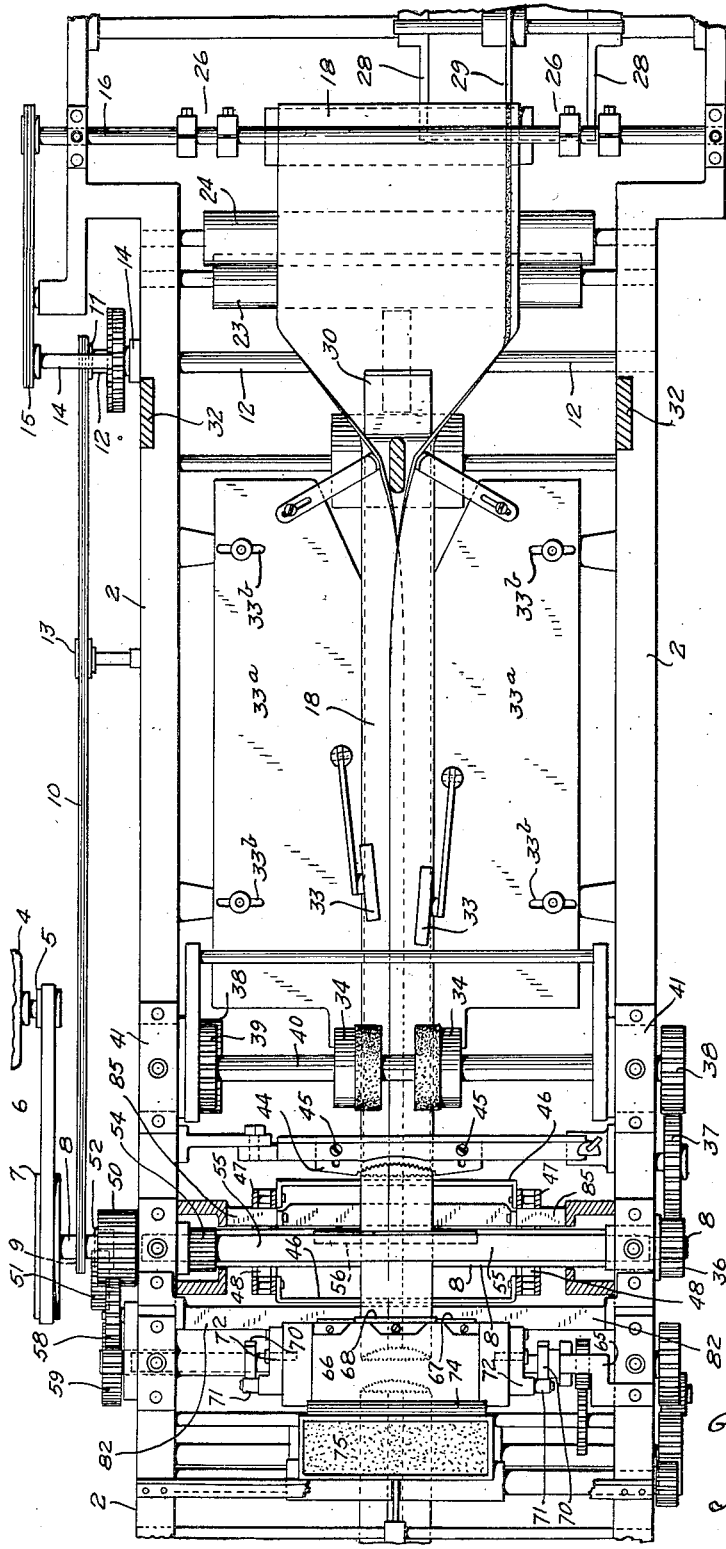

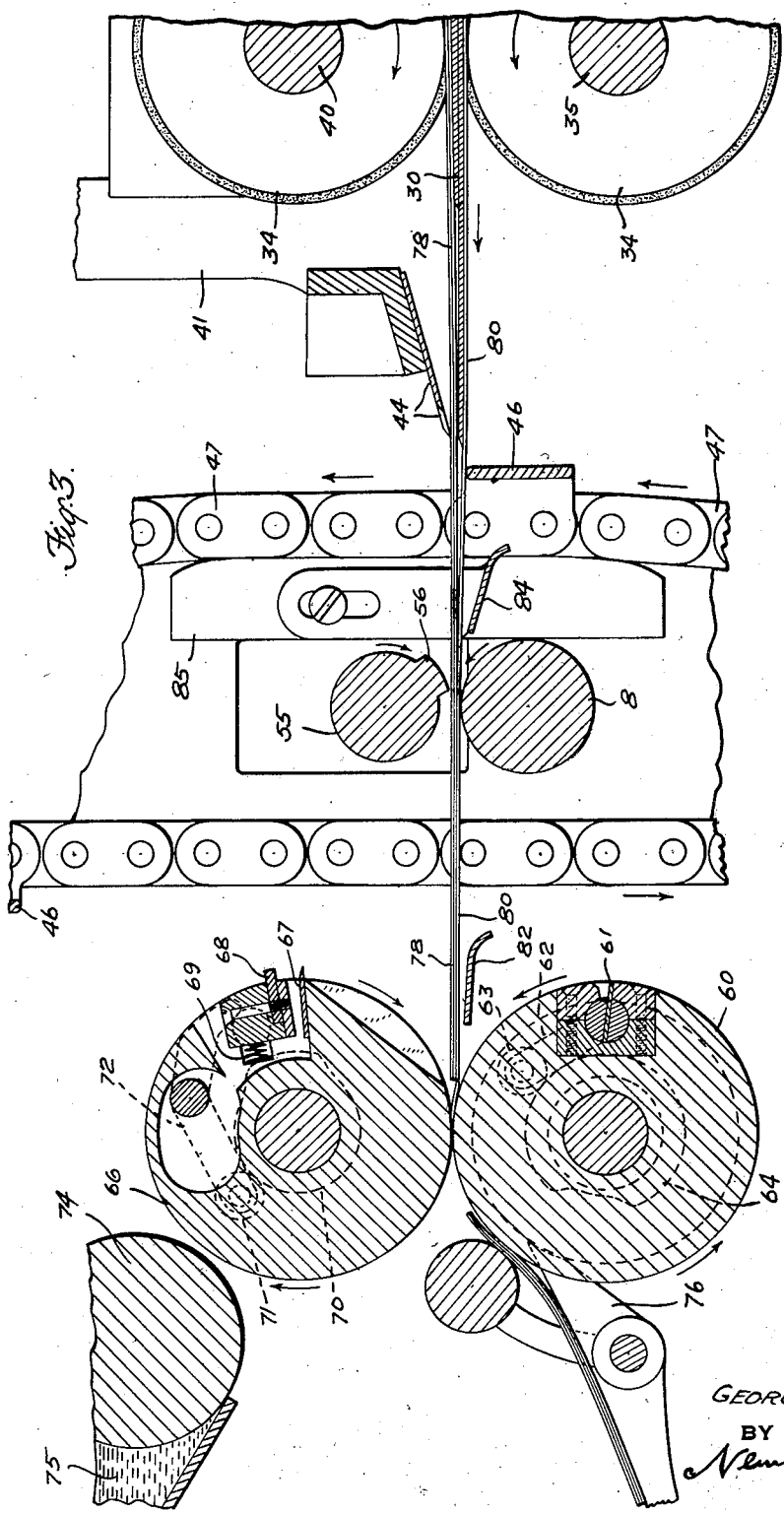

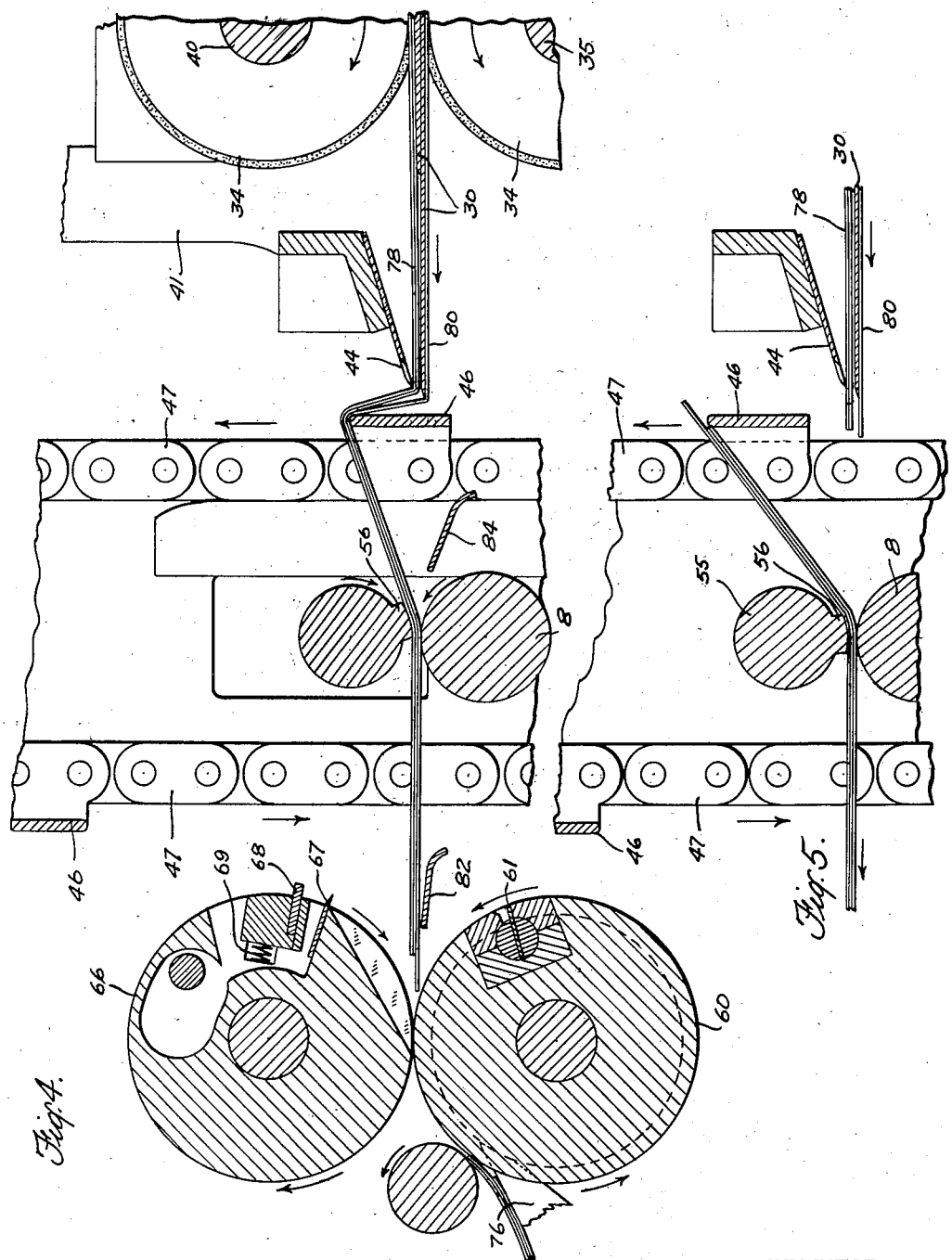

PROCESS AND MACHINE FOR MAKING BAGS

Filed June 25, 1932  5 Sheets-Sheet 5

INVENTOR
GEORGE W. POPPE.
BY his ATTORNEYS

Patented Oct. 9, 1934

1,976,513

UNITED STATES PATENT OFFICE 1,976,513

PROCESS AND MACHINE FOR MAKING BAGS

George W. Poppe, Brooklyn, N. Y., assignor to Equitable Paper Bag Co., Inc., Brooklyn, N. Y., a corporation of New York Application June 25, 1932, Serial No. 619,173

3 Claims. (Cl. 93—18)

This invention relates to a process and machine for making bags, bag envelopes and the like and has for its object the attainment of an extremely high percentage of perfect bags or bag envelopes having a variety of length of lip and even though the materials from which the bags are made may vary greatly.

Machinery for making bags is very old. In such machines a paper bag is formed by first folding a web of paper over a former to produce a bag tube. Such tube is fed or pulled forward by feed rollers towards cutter knives having serrated cutting edges which sever the bag tube. The end of the former constitutes one knife edge and a supplemental knife edge is situated a little above the former edge and spaced back from the same. These old machines also provide pinch bars whose function has always been to momentarily retard the bag tube, thereby creating a slack to enable the severance of the tube by the knives. In said old machines, a striker bar moving at a high linear speed acts to sever the tube when sufficient slack has been created. The sequence of operation would be—first, retardation by the pinch bars to create slack; second, severance of the tube by the striker bar.

In order that a good shearing action may be obtained it is necessary to create a slack in the bag tube, such slack providing for the necessary angle between the plane of the bag tube and the plane of the knives. The angle which it is necessary to obtain to make a good cut will vary with the material constituting the bag tube. For some kinds of paper a relatively small angle may be sufficient to obtain a good shearing action but for tougher paper a greater angle is necessary. For materials such as cellophane it is found that the angle of severance must be quite large and many difficulties have been encountered by reason of this necessity. In the machines as heretofore constructed variations in the slack may be brought about but the problem has not been to create slack sufficient to give a good shearing action, but to avoid the difficulties which a large amount of slack has heretofore introduced. In the machines as constructed the feed rollers pull the tube along but the slack is created on the other side of the rollers and on this side their action is to push the tube forward between the upper and lower knife edges. These must be set fairly close together in order to get a good cut and by reason of this fact there is some friction. It is most desirable that all of the slack be produced in front of the knife edges and not any of it behind them, but by reason of the pushing action of the feed rollers and the friction of the tube in passing between the knives some slack frequently builds up behind the knife edges and causes a choking of the machine. When such choking occurs the machine must be stopped and the choking material removed before further operations can be proceeded with. This entails considerable loss of time and also considerable loss of paper. This difficulty usually arises when the amount of slack attempted to be obtained by the old action of the pinch bars is considerable. If, however, the slack is not sufficient to give a good shearing action another difficulty is encountered. Under such conditions the cut is irregular and the bag is spoiled. Such bags must, of course, be discarded.

It has been found in practical operations that when cellophane is used the amount of imperfect bags may be as high as 15% due to choking of the machine if the slack is considerable or the spoiling of bags if the slack is not great enough.

The present invention overcomes these difficulties and by the process and machine herein disclosed the percentage of perfect bags approaches 100%.

A feature of the invention relates to a new method and means for creating the slack; the striker bar acting solely to perform this function. In other words, according to the present invention the striker bar is given a new function, while the pinch bar no longer performs this function, its sole function being to momentarily hold the bag tube after the slack has been created and at the moment of severance, the pinch bar acting to cause the bag tube to become taut at the instant that the striker bar severs the bag walls. Instead of retarding the bag tube to create slack the bag tube beyond the feed rollers is free and as the striker bar engages it the movement of its free end is reversed to create the slack before the pinch bars function at all. In the present invention, therefore, the steps consist in first creating the slack and subsequently holding the bag tube at the moment of severance and for the purpose of producing the necessary tautness of the tube whereby severance may be properly performed.

The process as well as the machine for carrying out the process will be better understood from the following detailed description with the aid of the accompanying drawings in which—

Figure 1 is a longitudinal section of a bag machine for carrying out my invention;

Figure 2 is a section on the line 2—2, Figure 1;

Figure 3 is an enlarged section of a portion of the machine showing the parts in the position shown in Figure 1;

Figure 4 shows the same parts as Figure 3 but in a more advanced stage of the bag formation;

Figure 5 shows some of the same parts at a still later stage in the operation.

Figure 6:
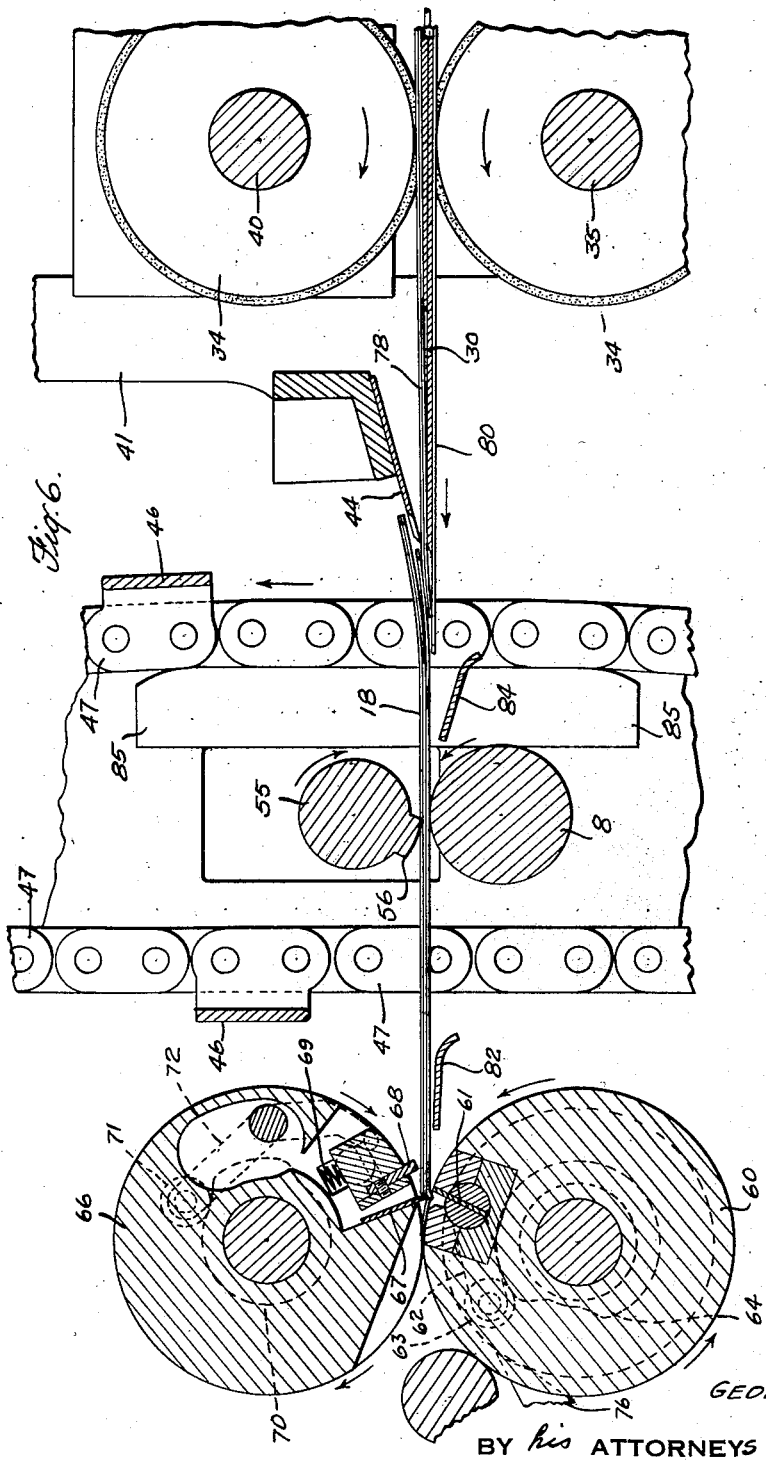
Figure 6 shows similar parts after the bag has been formed and just at the instant when the bottom forming mechanism begins to function.

Referring to the drawings and more particularly to Figure 1, there is the usual supporting framework 2, the side members of which carry various shafts for driving the usual mechanism of a bag machine. In Figure 2 there is shown a motor 4 whose shaft is provided with a pulley 5 connected by a belt 6 to a pulley 7 on a shaft 8. This shaft 8 carries the lower pinch bar roller as well as a sprocket 9 over which passes a chain 10 connected to a sprocket 11 on a shaft 12. A tension roller 13, Figure 1, is provided to keep the sprocket chain 10 sufficiently taut. The shaft 12 carries a gear that meshes with a similar gear on shaft 14. The latter shaft carries a sprocket wheel for engagement with a sprocket chain 15 by which motion is transmitted to a shaft 16. This shaft carries tube cutting devices which are used only when a bag having a long lip such as described in my Patent Number 1,798,168 is to be made. These devices for forming cuts in the bag tube are shown in Figure 2 of said patent and are so arranged that they may be thrown out of operation when an ordinary bag having a short lip is being made. In order to make the present disclosure as simple as possible the machine is arranged for making an ordinary short lip bag known commercially as a grocery bag.

The paper from which the bag tube is to be formed is fed as a web 18 from a roller 19 supported on a shaft 20 in the lower portion of the rear framework. The web passes over guide rollers 22, 23 and 24 and around another roller 26 which reverses its direction of movement, the latter roller being carried by a shaft 27. As the web passes about the roller 26 paste is applied from the paste pot 28 into which dips the narrow disk 29. The web, after passing the reversing roller 26, is delivered to mechanism which folds it into a bag tube. This mechanism is of the usual and well-known construction and includes a former plate 30, the right hand end of which, Figure 1, is bent upwardly at an angle of about 45°. This former is supported from a crossbar 31 carried by arms 32 projecting forwardly and upwardly as a part of the framework 2. The web passes under the former plate and is folded over on it as illustrated in Figure 2, rollers 33 suitably supported serving to make the fold smooth. The particular machine illustrated is designed to make what is known as a bellows fold, and in order that such a fold may be formed in the bag tube plates 33a adjustable in slots 33b are supported from the frame 2 such plates being of old and well-known construction. The folded tube then passes between upper and lower pairs of feed rollers 34. The lower rollers 34 are mounted on a shaft 35 which is geared to the lower pinch bar shaft 8 in the following manner: At its right hand end the shaft 8 is provided with a gear 36, Figure 2, which engages an idler 37, the latter meshing with a gear 38 on the shaft 35. 36 is a change gear and different gears may be used to regulate the bag tube length. At its opposite end the shaft 35 carries a gear which meshes with a gear 39 on the upper feed roller shaft 40. This shaft is supported in a housing designated generally as 41 and having as is usual means for varying the pressure of the upper feed rollers against the bag tube. A bracket carried by the side frames supports the upper knife edge 44 which in the present machine is shown as having a curved serrated edge. This knife is adjustable in the bracket by means of screws 45, Figures 1 and 2, engaging slots in the knife. The end of the former is also serrated but this is shown in Figure 2 as a straight edge.

As previously stated the present machine is shown adjusted for a short lip bag. If a bag of longer lip is desired such for instance as the type of bag shown in my aforesaid patent, then preliminary slits would be made in the web by the cutting devices carried by the shaft 16 and the knife edges would be spaced further apart in the longitudinal direction of the feed of the bag as will, of course, be readily understood. The upper knife, or lip knife as it is called, would in some cases have a straight edge instead of a curved edge.

After the web has been folded into a bag tube and is engaged by the feed rollers 34 the next operation consists in severing the bag tube and folding the bag bottom. The mechanism for forming the bag bottom is also the same mechanism as has been previously used in bag machines and needs no detailed description.

The mechanism particularly concerned with the carrying out of the present invention includes the relation of the pinch bars to the striker bar and the proper timing of these parts. The striker bar 46 is supported by sprocket chains 47 symmetrically located in respect of the longitudinal axis of the machine and these sprocket chains are carried and driven by a lower sprocket wheel 48 and upper sprocket wheel 49. The sprocket chains carrying the striker bars, of which two are provided, are driven from the lower pinch bar shaft 8 which at its upper end as shown in Figure 2 carries a gear 50 meshing with an idler 51 which in turn engages a pinion 52 on the shaft 53 of the lower sprocket wheel 48.

The lower pinch bar shaft also carries a pinion which meshes with a similar pinion 54 carried by the upper pinch bar shaft 55, Figure 2. The pinch bar shafts 8 and 55 are driven in a 1 to 1 ratio and the pinch bar itself consists of a segment 56 set into the shaft, the radius of the segment being equal to the radius of the lower pinch bar roller. The circumferential extent of the segment is such that the bag tube is retarded only for a period of time sufficient to enable the striker bar to sever a bag length from the tube and to move the severed bag on to a position to be engaged by the tucker blade carried by the upper tucker roller which in connection with a lower roller forms the bag bottom in the usual manner.

As before stated the bottom forming mechanism is of the usual type. However, a brief description of this mechanism will be given in order to make this disclosure complete and to show the timing of the parts in the formation of a bag.

I have already referred to the gear 50 on the shaft 8. This gear also engages an idler 58 which meshes with a gear 59 on the lower cylinder 60. This cylinder carries the usual clamp 61 operated by an arm 62 by means of a roller 63 engaging a cam 64 supported by a bracket 65 connected to one of the side members 2 of the supporting frame as shown at the left lower portion of Figure 2. The lower cylinder 60 is geared to the upper cylinder 66 in a 1 to 1 ratio. The upper cylinder carries a tucker blade 67 and a paste bar 68 operating as is customary in machines of this character to perform their usual function. As is usual the paste bar is urged to paste applying position by spring 69 but is withdrawn under control of a cam 70 operating on a roller 71 carried by an arm 72 supported from a bracket carried by the upper frame member 2, Figure 2. At each rotation of the cylinder 66 the paste bar receives paste from a roller 74 loosely rotatable in a paste pot 75. The usual stripper fingers 76 engage the finished bag and divert it from the cylinder 60 after the bottom fold of the bag has been formed and pasted and when the bag is released from the clamp.

My improved process consists in creating slack in the bag tube prior to any holding or retardation of the tube, and in the particular form of machine which I have used for carrying out this process the gearing between the shaft 8 and the striker bar driving mechanism is such that when the bag tube has been advanced to the position shown in Figure 1, the striker bar is just in position to contact with the lower wall of the bag tube but the pinch bars have not yet come into action.

In order to clearly explain the process of making a bag according to the present invention and to fully understand the operation of the particular machine which by way of example I have illustrated as one form of carrying out this process, reference is made to Figure 3 which is an enlarged view of a portion of those parts of Figure 1 which are more directly concerned with the present invention. In Figure 3 the upper wall of the bag tube is indicated by the reference character 78 and the lower wall by reference character 80. In this figure the bag tube has been advanced to the position where the end of the bag tube is just about to engage the bottom forming cylinders 60 and 66. The pinch bar 56 has not yet engaged the bag tube and at the instant shown in Figure 3 the bag tube is moving towards the left under the pull of the feed rollers 34. The ascending striker bar 46, however, is just in engagement with the lower wall 80 of the bag tube. Figure 4 shows the position of the same parts an instant later. The striker bar has moved from the position shown in Figure 3 and the pinch bar is just about to engage the tube to cause severance of the tube walls. It will be noted that the upward movement of the striker bar has pulled the free end of the bag to the right a slight distance and this will be apparent by comparing the tube end of the bag tube as shown in Figure 3 with this same end as shown in Figure 4. This movement is slight because the feed rollers 34 are advancing the bag tube at the same time that the striker bar 46 is creating the slack but since the striker bar moves with a linear velocity greater than the peripheral velocity of the feed rollers 34 the slack that the feed rollers alone would permit is not as much as the striker bar requires and in consequence of these relative velocities, the free end of the bag tube is pulled somewhat to the right. This is an important factor because there can never be any slack created to the right of the cutting edges of the knives and therefore there can be no possibility of any clogging of the machine by reason of this gathering of slack behind the knives as is frequently the case when the slack is created by retarding the tube by the pinch bars.

An instant after the condition of the machine as depicted in Figure 4, the tube is severed by the edge of the former and the knife 44 and the pinch bar has reached what may be considered its central position depicted in Figure 5. A bag tube length has now been completely severed from the tube and is engaged only by the pinch bars and this engagement persists while the parts move from the position shown in Figure 5 to the position shown in Figure 6. In the Figure 6 position the pinch bars have released the bag tubes but about the same time the tucker blade 67 engages the bag bottom and tucks it into the clamp 61. The gearing from the shaft 8 to the cylinders 60 and 66 is such as to cause these cylinders to rotate with a peripheral speed which is greater than the speed of either the pinch bars or the feed rollers so that the bag is quickly withdrawn, the bottom fold is made and pasted, and the finished bag delivered. The descending striker bar 46 as it moves downwardly engages the bag and merely bends it down over a guide apron 82 suitably supported in the side frames as shown in Figure 2. Another guide apron 84 carried by members 85 also supported in the side frames acts to guide the bag tube to the pinch bars. From a consideration of Figure 4 it will be observed that the angle formed by the bag tube and the knife edge 44 and with the former edge is approximately a right angle which insures a very effective cut. The timing between the pinch bars and the striker bar 46 may be varied of course to give a greater or less angle, depending upon the kind of material used for the bags.

In actual experience in working with cellophane which is extremely difficult to handle I have obtained substantially 100% perfect bags in commercial production. While I have used cellophane as an example of difficult material to handle on machines of this character the invention is not restricted to any particular type of material out of which the bags are made but has advantages when paper such as is used in ordinary grocery bags is used because all of the slack is created at the precise point where it is desired and there is no possibility of choking and no possibility of imperfectly cut bag lips due to the fact that the angle of cut is insufficient.

What I claim is:—

1. In a machine for making bags, the combination with tube forming and tube feeding devices and upper and lower knives for severing the respective walls of the bag tube, of a striker bar operating to engage the bag tube and create a slack therein while the tube is still free and means for subsequently momentarily retarding the bag tube to enable the striker bar to sever the same against the knife edges.

2. In a bag machine, the combination with tube forming and tube feeding mechanism, of pinch bars for retarding the bag tube and a striker bar for severing the tube, said striker bar operating in such timed relation with the pinch bars that the tube is engaged and a slack created by the striker bar prior to the retarding thereof by the pinch bars.

3. In a machine for making bags the combination with tube forming and tube feeding mechanism, of pinch bars for momentarily retarding the feeding movement of the bag tube and a striker bar for severing the tube, said striker bar also acting to create a slack in the bag tube prior to retardation thereof by said pinch bars.

GEORGE W. POPPE.